United States Patent [19]

Gordy

[11] 4,259,147

[45] Mar. 31, 1981

[54] PULPING PROCESS

[75] Inventor: John Gordy, E. Richmond, Canada

[73] Assignee: New Fibers International, Nassau, The Bahamas

[21] Appl. No.: 83,784

[22] Filed: Oct. 11, 1979

Related U.S. Application Data

[63] Continuation of Ser. No. 962,970, Nov. 22, 1978, abandoned, which is a continuation-in-part of Ser. No. 842,262, Oct. 14, 1977, abandoned, which is a continuation of Ser. No. 551,259, Feb. 20, 1975, abandoned.

[51] Int. Cl.³ .................... D21C 3/06; D21C 3/26
[52] U.S. Cl. .................................. 162/12; 162/13; 162/14; 162/15; 162/16; 162/28; 162/47; 162/57; 162/60; 162/64; 162/70; 162/77; 162/86; 162/163; 162/165; 162/225; 71/25; 71/64 C; 71/DIG. 2; 260/17.5; 260/124 R; 264/122
[58] Field of Search .................... 162/14, 15, 16, 11, 162/12, 27, 60, 83, 64, 63, 90, 163, 165, 225, 25, 77, 86, 57, 59, 84, 70, 28, 47; 260/124 A, 17.5; 264/122; 71/11, 25, 646, DIG. 2

[56] References Cited

U.S. PATENT DOCUMENTS

| | | | |
|---|---|---|---|
| 1,016,178 | 1/1912 | Sammet et al. | 162/64 |
| 1,490,774 | 4/1924 | Harnist | 71/25 |
| 2,037,522 | 4/1936 | Lundsack | 162/163 |
| 2,046,750 | 7/1936 | Mason et al. | 162/163 |
| 2,752,243 | 6/1956 | Barton et al. | 162/31 |
| 2,846,431 | 8/1958 | Goss | 162/163 |
| 2,872,337 | 2/1954 | Heritage et al. | 162/165 |
| 2,885,317 | 5/1959 | Collin et al. | 162/84 |
| 2,964,518 | 12/1960 | Snyder | 162/63 |
| 3,244,505 | 4/1966 | Adolphson | 71/25 |
| 3,428,520 | 2/1969 | Yiannos | 162/16 |
| 3,522,230 | 7/1970 | Burkhart | 260/124 |
| 3,578,553 | 5/1971 | Godsay et al. | 162/14 |
| 3,658,638 | 4/1972 | Ludwig et al. | 260/17.5 |
| 3,726,756 | 4/1973 | Polak | 162/64 |

FOREIGN PATENT DOCUMENTS

| | | | |
|---|---|---|---|
| 481559 | 6/1973 | Australia | 162/64 |
| 679079 | 6/1952 | United Kingdom | 162/11 |

*Primary Examiner*—William F. Smith
*Attorney, Agent, or Firm*—LeBlanc, Nolan, Shur & Nies

[57] ABSTRACT

A versatile process and apparatus is presented for producing, in high yields, many different grades of pulp from a single wood specie or for pulping any specie or type of woody material, and for storage and recycling of the by-product liquid and gaseous materials. The process of this invention is virtually pollution free, and the reactant chemicals are recoverable from the by-products. In the alternative, the by-products themselves have a commercial value which may forestall recovery of the reactants. The lignin constituent extracted from the pulp is usable as a resin binder, a wood rehardening agent, or a glue. Depolymerization or digestion of the wood chips is achieved by exposure initially to ammonia and sulfur dioxide for from 10 to 60 minutes or more depending on the parent wood and pulp grade desired under controlled pressure and temperature conditions, and subsequently to sulfur dioxide from 10 to about 60 minutes also under controlled conditions of temperature and pressure in a digester vapor dome adapted to suspend a chip mass in the reactant gases. The digested chips are then defibrated in a lignin dissolving solution of monoethanolamine to extract the lignin constituent.

51 Claims, 6 Drawing Figures

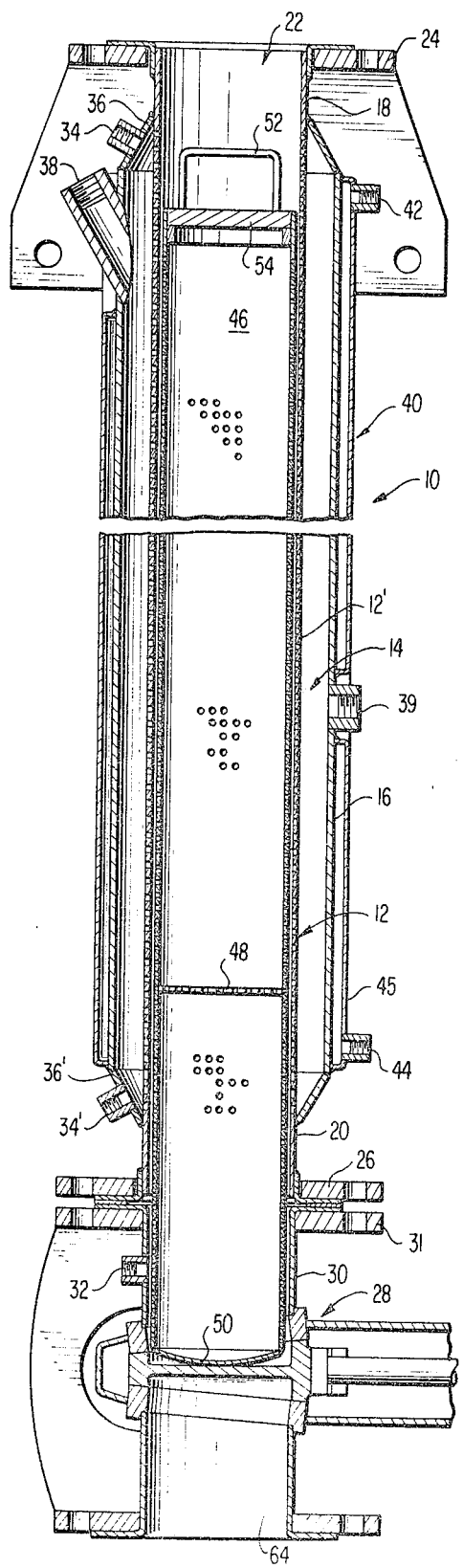
FIG. 3
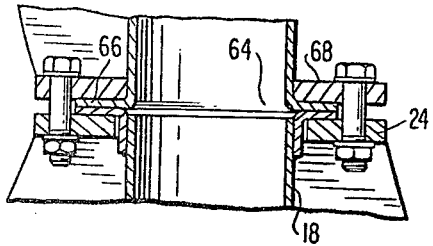
FIG. 5
FIG. 4
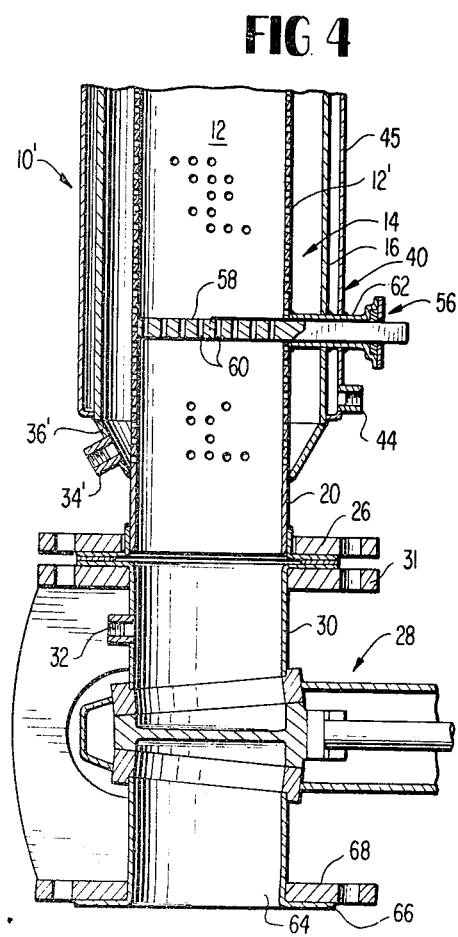

PULPING PROCESS

This patent application is a continuation of U.S. patent application Ser. No. 962,970, filed Nov. 22, 1978, now abandoned, which is a continuation-in-part of U.S. patent application Ser. No. 842,262, filed Oct. 14, 1977 abandoned, which application was a continuation of U.S. patent application Ser. No. 551,259, filed Feb. 20, 1975, now abandoned.

This invention relates to a clean and efficient means for producing paper pulp or an intermediate fibrous material and readily reusable by-products. More particularly, this invention relates to a pulping process adaptable to produce pulp in high yields from a wide variety of wood materials, and also adaptable to produce pulp of different grades from any of said materials merely by varying the process time. The apparatus of this invention has sucessfully pulped over 20 varieties of wood and has produced pulps of from container grade to dissolving and high paper grades by chemical action without creating the toxic liquors and noxious gases associated with, for example, commercial Sulfate (Kraft) or Sulfite pulping processes. By removing lignin from the wood without the use of harsh chemicals the yield of pulp is substantially increased and the by-products have been found to be uncontaminated and fully usable, commercially.

While it is known to pulp woody substances in gaseous media as described in U.S. Pat. No. 3,726,756, owned by the assignee of this invention, the instant process achieves vastly superior results in a much more efficient digestive vessel.

The Sulfite and Kraft processes are the primary commercial processes used to produce wood pulp. Both, however, are typified by large installations requiring large capital investments, and accordingly, huge volumes of wood and water must be processed daily in order to operate enconomically. In addition, both produce highly noxious by-products and are therefore environmentally undesirable.

Both the Sulfite and Kraft processsses remove lignin from the wood by prolonged cooking in aqueous solutions of harsh chemicals. In these solutions the lignin migrates from the cellulose fibers into the solution, and reacts, irreversibly, with the strong chemical pulping agents. These chemical agents also degrade the cellulose fibers and thereby lower the yield of the pulp produced.

In the Sulfite process the waste or "black" liquor remaining after the pulp is removed is extremely toxic and environmental standards severely restrict the means of disposal. Recovery of the chemical constituents therefrom is normally employed but this requires construction of a large, expensive recovery plant. Even then, the most efficient plants emit aesthetically undesirable gaseous by-products.

The Kraft process also produces undesirable by-products such as malodorous mercaptans and sulfides, and plants employing this process must be located in remote areas. Furthermore, the waste wash liquors are also a disposal problem in that they discolor water and promote foaming and algea growth if pumped into lakes or streams.

In addition to environmental considerations, the Sulfite process is further limited to softwood raw materials. Resinous woods such as pines are not pulped according to this process because extractives such as pitch are very difficult to process.

The Kraft process, in contrast, will pulp hardwoods as well as softwoods. However, Kraft pulp contains a residual of highly condensed lignin which imparts a dark color to the pulp and paper made therefrom. To produce paper grade pulp, Kraft pulp must be severely bleached and the bleaching process further degrades the cellulose fibers, lowering the yield. The Kraft process also cannot produce a dissolving grade (cellophane) pulp.

It has been discovered, however, that any specie or grade of wood may be pulped by chemical action without an aqueous liquor in the two-step digestion process of this invention. According to the process of this invention, during digestion, the lignin molecules are depolymerized or gelled in situ. The lignin may then be separated merely by agitating the digested wood chips in the presence of a lignin solvent without appreciably degrading the cellulose fibers. Most importantly, the solvent may then be easily recovered by distillation without contaminating the extracted constituents.

The process of this invention then will pulp wood without producing environmentally undesirable liquors or gases, and does not require an expensive recovery plant for by-products. In fact, the by-products of the process of this invention are uncontaminated by the pulping process and are readily convertible to commercial products. In the alternative, ammonia and sulfur dioxide, the pulping agents, may also be recovered from the by-products together with the water generated by the reaction if economic considerations dictate.

By initially impregnating a wood chip batch with ammonia and water ($NH_4OH$), and then with sulfur dioxide under controlled conditions of pressure and temperature, in the vessel of this invention, and subsequently, digesting with sulfur dioxide gas in this digester vessel, the lignin constituent will, apparently, depolymerize for extraction without migrating away from the cellulosic fibers. Furthermore, the lignin depolymerizes without being contaminated by or reacting irreversibly with the pulping media.

Following digestion the chips are physically soft, wet, and pliable. The chip feed may have a moisture content of up to 50 percent, by weight. A portion of this moisture is expelled during the initial impregnation step, and the moisture remaining within the chips promotes the depolymerizing action of sulfur dioxide on the lignin molecules in the second digestion step.

The digestion process may be stopped before completed, and if the chips are permitted to dry, they will return to their original consistency. Chips subjected to the first digestion step only may be defibrated, as will be subsequently described, to form insulation or packing material. If, however, after the chips are digested, they are admixed with a solvent such as monoethanolamine, and the slurry then defibrated by passing it through, for example, a conventional slurry pump, the chips will be slushed to pulp almost instantaneously. The liquid fraction containing water, the solvent, and lignin and other wood constituents may then be readily separated from the pulp in, for example, a centrifuge.

The liquid fraction may be distilled to recover the solvent and concentrated in an evaporator. The water recovered by evaporation may be used to wash the pulp. It has been found that the process of this invention actually gains water as the wood is pulped.

An important feature of this invention is also the discovery that merely by varying the exposure time in the digester from 10 to 60 minutes or more per step different grade pulps may be produced. By subjecting the chip mass to an initial impregnation at about 150-200 p.s.i.g. pressure and 250°-275° F. for 60 to 90 minutes followed by a final digestion in sulfur dioxide gas at up to about 200 p.s.i.g. pressure, dissolving grade or high quality paper grade pulp may be produced. This pulp has been found to exhibit properties superior to those for these grades of pulp produced by the Sulfite process.

However, if the time is lowered to from 10 to 30 minutes for each digestion step, container grade pulp may be produced, exhibiting properties nearly equivalent to those for this grade of pulp made by the Kraft process. It should be noted, however, that as the time approaches 10 minutes a conventional refining step may be necessary to defibrate the chips. At 20 minutes, though, a good container grade pulp may be made without refining.

In addition, in contrast to the Kraft process, it has been found that only a mild bleach is necessary for the preparation of bleached pulp. This should be contrasted to the strong bleach required with the conventional Kraft pulp which tends to degrade the cellulosic fibers, lowering the yield, as noted above.

New Fiber Pulp

It has also been discovered that by eliminating the harsh chemical treatments used in the conventional Sulfite or Kraft processes, even with bleaching, the yield from the process of this invention will be substantially increased. Although it is not known with certainty, it is believed that the process of this invention produces pyrosulfite radicals in excess sulfur dioxide which radicals attack the bonds binding lignin to the cellulose without substantial damage to either the hemicellulose or $\alpha$-cellulose fractions.

Pulp produced according to the process of this invention, as will be subsequently explained, has been found to exhibit properties substantially different from those of pulps produced by conventional processes. It is estimated that the process of this invention may remove about 95 percent of the lignin constituents without decreasing the fiber content of the pulp. The process of this invention then will increase the overall pulp yield from 10 to 15 percent over that achieved with conventional processes.

Moreover, the pulp produced has consistently been found to be superior to Sulfite in quality yet nearly equal to Kraft in strength. Representative pulps prepared according to the process of this invention were evaluated for unbleached physical strength, bleaching response, bleached physical properties, and $\alpha$-cellulose content of both bleached and unbleached pulps. These tests verify that the process of this invention produces a pulp consisting of novel and unique fibers. Although it is not known with certainty, the unique characteristics of this new fiber pulp are, as noted above, believed to stem from the fact that the process of this invention separates the lignin constituent from the cellulose, without substantial damage to the $\alpha$- and hemi-cellulose fractions thereof.

The Digestion Vessel

It has been discovered that by using the vessel of this invention, wood chips may be digested efficiently without a large installation, and without the need for a conventional recovery plant. Therefore, the vessel of this invention may be dimensioned to operate at any convenient capacity. Because the process utilizes moisture inherent in the wood to provide a reaction medium for attacking the lignin-cellulose bonds a continuing external source of water is not required. In addition, because the process is pollution-free, the plant need not necessarily be located in a remote area. In fact, a portable or semiportable installation may easily be adapted to take advantage of marginal stands of timber in arid or semiarid regions or in populated areas.

Essentially the vessel of this invention comprises a structure for suspending a chip bed under a pressurized vapor dome with, preferably, an external heating means. Specifically, the wood chips are suspended with a vertically disposed, foraminous, cylindrical structure which is the inner wall of a sealed vapor jacket. The vapor jacket also includes a sealable outer vapor jacket wall which extends both above and below the chip bed. The jacket outer wall has ports therethrough for the admission of gaseous and liquid reactants which are in communication with chips through the inner wall of the jacket and with the upper and lower surfaces of the bed. Finally, in one embodiment of this invention the vapor jacket is itself surrounded by a steam jacket heating means. As will be obvious to those skilled in the art, appropriate devices are included for monitoring the temperature and pressure within the vapor dome, and at least the pressure within the steam jacket.

In one embodiment of this invention the chips are contained in a mesh basket which is lowered into the vessel through an upper port. A lower port is also provided in the vessel which is normally sealed by a gate valve disposed therein. The bottom of the basket is supported by the gate and a mesh, false bottom is provided therein for suspending the chips to expose the lower portion of the chip mass to liquid and gaseous reactants. Following digestion, liquid and gaseous reactants exit the vessel at ports in the lower portion thereof, and the basket of chips is removed through either port.

In an alternative and preferred embodiment, a second gate valve is disposed within the vessel above the exhaust port and above the first gate. The second gate extends, when closed, across the interior of the foraminous inner vapor jacket wall, perpendicular to the longitudinal axis of the jacket. The chips are poured directly into the vapor jacket through the upper port. The gate then supports chips during digestion and eliminates the need for the basket.

It is essential to efficient digestion that the chip mass must be uniformly exposed to the reactants on all sides thereof and on the upper and lower surfaces. Therefore, the supporting gate valve plate has a plurality of holes extending vertically therethrough to expose the lower portion of the chip mass to the gaseous reactants from the vapor jacket. In addition, the vapor jacket is adapted to extend above the upper surface of the chip bed, and below the foraminous gate to permit circulation of the reactants throughout the bed. After the reactants are expelled from the vessel through the exhaust port, the gate valves are opened, and the chips may then be expelled from the vessel through the lower port. The digested chips may then be conveyed to a defibrator for pulping, as will be subsequently explained.

Process By-products

The principal by-products of the process of this invention are the liquid and gaseous, used, reactants from the digester, and the extracted lignin solution.

While the process reactants may be recovered from the by-products of digestion by utilizing techniques obvious to those skilled in the art, it has been discovered that these by-products themselves have good commercial value. Therefore, the economics of the pulping operation may dictate commercial utilization of the by-products rather than recovery of the reactants.

The by-products of the initial impregnation step of digestion are generally sulfur dioxide gas, steam, water, ammonium bisulfite, and wood sugars and trace metals from the wood. The by-products also include some lignin because the liquid expelled from the digester has been observed to be brownish in color.

These materials may be readily converted to fertilizers. If the excess sulfur dioxide gas from the second digestion step is bubbled through this liquid in the presence of an excess of nitric acid, sulfuric acid and ammonium sulfate will be formed. In addition, if the liquid is passed through a cell with a sacrificial anode and organic constituents thereof will chelate with metal ions from the anode. By selection of the anode and the cell reaction then the chelates may be tailored to supply any desired mineral to the sulfate fertilizer base.

It will be obvious to those skilled in the art that other fertilizers may be formed using different reactions. For example, ferric ion may be used in a cell to oxidize the sulfites and thereby eliminate the need for nitric acid as the sulfite converter.

Following chelation the fertilizer need only be neutralized with, for example, ammonium hydroxide, and concentrated in an evaporator. The concentrated fertilizer then will be ready for use. Water recovered in the evaporator may be used in the pulp washing steps. However, as will be obvious to those skilled in the art, if the plant is located in an arid region it may be desirable to leave the fertilizer in a dilute solution for use in the immediate locality.

The digested lignin is of major importance to the economic aspects of the process of this invention. Following digestion, the chips are defibrated by the mechanical action of, for example, a slurry pump in the presence of a lignin dissolving solvent. The solution of extracted lignin may then be separated from the pulp in, for example, a centrifuge or screw press. In the alternative, the digested chips may be cooked in the digester in the solvent under for example 50 p.s.i.g. pressure and a temperature of up to 250° F. for 30–60 minutes and the liquid separated from the chips prior to defibrating.

The lignin dissolving solvent preferred, monoethanolamine, may then be readily recovered by distillation and the lignin solution may be further concentrated by evaporation. The water removed by evaporation may also be returned for use in the process to wash the pulp.

The lignin concentrate has been found to have many uses. For example, if the lignin is reacted with formaldehyde a hardwood conversion resin will be formed. This resin may be painted, sprayed, or otherwise absorbed onto lower grade wood whereupon it will be dry to form a hardened surface. This resin may be used to upgrade wood by providing a tougher, more wearresistant surface, or it may be used to prevent checking or splitting of low grade lumber. The solution including lignin and the solvent without formaldehyde may also be absorbed onto wood to upgrade lower grade lumber.

The lignin concentrate may in the alternative be admixed with phenol and formaldehyde to form a strong glue adaptable for use as a laminate with plywood. The glue, of course, may contain conventional fillers such as powdered cellulose, if desired.

The digested chips after either first or second stage digestion may also be ground wet without removing the depolymerized lignin or defibrated in a high speed defibrator. The material may then be pressed to form a lignin pressed board. In the alternative, the lignin dissolving solution may be added to extract some lignin. The liquid may then be separated and the ground chips pressed to also form a lignin hardboard. Defibrated chips may be used, as will subsequently be explained, as insulation or packing material.

Finally, the lignin concentrate may be admixed with formaldehyde to form a lignin resin. The resin may be added to, for example, washed or unwashed container grade pulp as a binder and the mixture pressed to form a lignin resin board.

The lignin concentrate then is adaptable to many different uses all of which have commercial value, i.e., to form an inexpensive binder, glue, or surface hardening agent.

In a preferred embodiment of this invention the spent chemical reactants, both liquid and gaseous are recovered and rapidly stored for reuse in accordance with the recovery system of this invention. The system includes a low-pressure vessel and a high-pressure vessel interconnected by a pair of pumps.

The low pressure vessel is normally connected to the digester vessel and functions to receive unused reactant gases. Instead of venting the used gaseous reactants in the digester into the atmosphere, the gases are vented through a release valve to the low-pressure vessel. However, the pressures in the digester and low-pressure vessel tend to equalize, and therefore it is necessary to provide a means for completely emptying the gaseous contents of the digester without venting to the atmosphere. Furthermore, as the two pressures approach a common value, the rate of flow from the digester slows. When the flow begins to slow as pressure builds in the low-pressure vessel the release valve is closed, and a high pressure gas pump used to pump the gaseous contents of the low-pressure vessel to a high-pressure vessel. A second high-pressure piston pump is also used to pump the liquid, which has condensed in the low-pressure vessel, to the high-pressure vessel so that the pressure within the low-pressure vessel is quickly returned to zero. When the pressure returns to zero the release valve is opened again and the procedure is repeated until the gaseous materials in the digester have been exhausted into the low-pressure vessel, and conveyed from the low-pressure vessel to the high-pressure vessel for storage.

The gaseous contents of the digester are principally steam and sulfur dioxide gas. Accordingly, in transferring the contents through the low-pressure vessel to the high-pressure, the steam will condense, and some sulfur dioxide gas will enter the liquid phase in the high-pressure vessel. The high-pressure vessel includes preferably an internal coil so that when it is desired to reuse sulfur dioxide gas, steam may be circulated through the coil to heat the contents of the high-pressure vessel to up to, for example, about 600 p.s.i. When the liquid within the high-pressure vessel is heated, sulfur dioxide gas re-enters the gaseous phase and may then be recharged to the digester for subsequent stage digesting.

In addition, the low pressure vessel may be utilized as a heat exchanger with, for example, a similar internal coil. The lignin dissolving solution may be circulated, prior to use, through the coil as the low-pressure vessel is charged from the digester to take up heat from the gaseous reactants. The heated solution or solvent may then be utilized to depolymerize lignin in the digested chips. As will be subsequently described, the chips may be, following stage two, admixed with the solvent in the digester vessel for an additional cooking phase of approximately one-half hour at, for example, 50 p.s.i.g. and a temperature of about 250° F.

Steam from the fertilizer plant evaporator may also be routed through the low-pressure vessel to the high-pressure vessel for condensation and storage. In the alternative, sulfur dioxide gas may be removed from the spent cooking liquor by steam stripping as is obvious to those skilled in the art. Sulfur dioxide may also be recovered from sulfonated sugar compounds in the cooking liquor by neutralizing the liquor with ammonium hydroxide followed by the subsequent displacement of sulfur dioxide with a strong acid such as sulfuric acid, in excess, and evaporation. The recovered sulfur dioxide is then pumped through the low-pressure vessel to the high-pressure vessel for storage.

Accordingly, it is an object of this invention to provide a pollution-free process and apparatus for pulping wood in an efficient manner to fully utilize the by-product constituents of the raw materials.

It is another object of this invention to provide an improved digester vessel for exposing a chip mass uniformly throughout to vapor and liquid reactants under controlled conditions of pressure and temperature including a means for suspending the chip mass in a vapor dome within a vapor jacket, and heating means for said jacket whereby said chip mass is uniformly exposed on all sides, and the top and the bottom thereof, to reactant vapors, heat and pressure, uniformly.

It is another object of this invention to provide a pollution-free process for providing, selectively, different grades of pulp from a single wood specie or for pulping a variety of different wood species and types to produce wood pulp in high yields and by-products which are fully usable, commercially.

It is yet another object to provide an improved pulping process for producing wood pulp which may have properties superior to pulp produced by the conventional Sulfite processes and nearly equivalent to pulp produced by the conventional Kraft process without noxious and aesthetically undesirable gas and liquid by-products so that said processes could be economically implemented without an enormous capital investment for recovery equipment and for pollution control.

It is still another object to provide an improved pulping process whereby the organic constituents of the wood, separated from the cellulosic fiber pulp are readily usable as fertilizers, and the lignin constituents are readily recoverable for use as a glue, binder, surface hardening agent or the like.

It is yet another object to provide a pulping process and apparatus whereby wood chips are uniformly exposed to ammonia and sulfur dioxide in a vapor dome at a temperature of at least 250° F. and at least 150 p.s.i.g. pressure for a preselected period of time, and subsequently, exposed to sulfur dioxide at a temperature of at least 230° F. and at least about 50 p.s.i.g., or preferably up to 200 p.s.i.g. to depolymerize the lignin constituent in situ so that the chip mass may be readily defibrated, the lignin constituent extracted with a recoverable solvent, and process reactants recovered for reuse.

It is a further object of this invention to provide a new fiber pulp from woody materials from which the lignin constituent has been extracted without substantial damage to the α and hemi-cellulose fractions.

It is yet a further object of this invention to provide a resinous glue, binders or impregnate having as a principal ingredient, the lignin fraction extracted from wood materials pulped in sulfur dioxide and ammonia and subsequently defibrated to permit extraction of the said lignin constituent.

It is still a further object of this invention to provide a pressed board material comprising digested wood chips which have been exposed to sulfur dioxide and ammonia under controlled conditions of temperature and pressure wherein the lignin molecules have been depolymerized in situ, which material is constructed by grinding said digested chips and subsequently pressing said chips to form boards.

These and other objects will become readily apparent with reference to the drawings and following description wherein:

FIG. 3 is a vertical sectional view with portions broken out of an embodiment of the digester vessel of this invention;

FIG. 4 is a fragmentary vertical sectional view of a preferred embodiment of the digester vessel of this invention;

FIG. 5 is a fragmentary vertical sectional view of a preferred embodiment of this invention showing the connection of two vessels.

Figure 1:
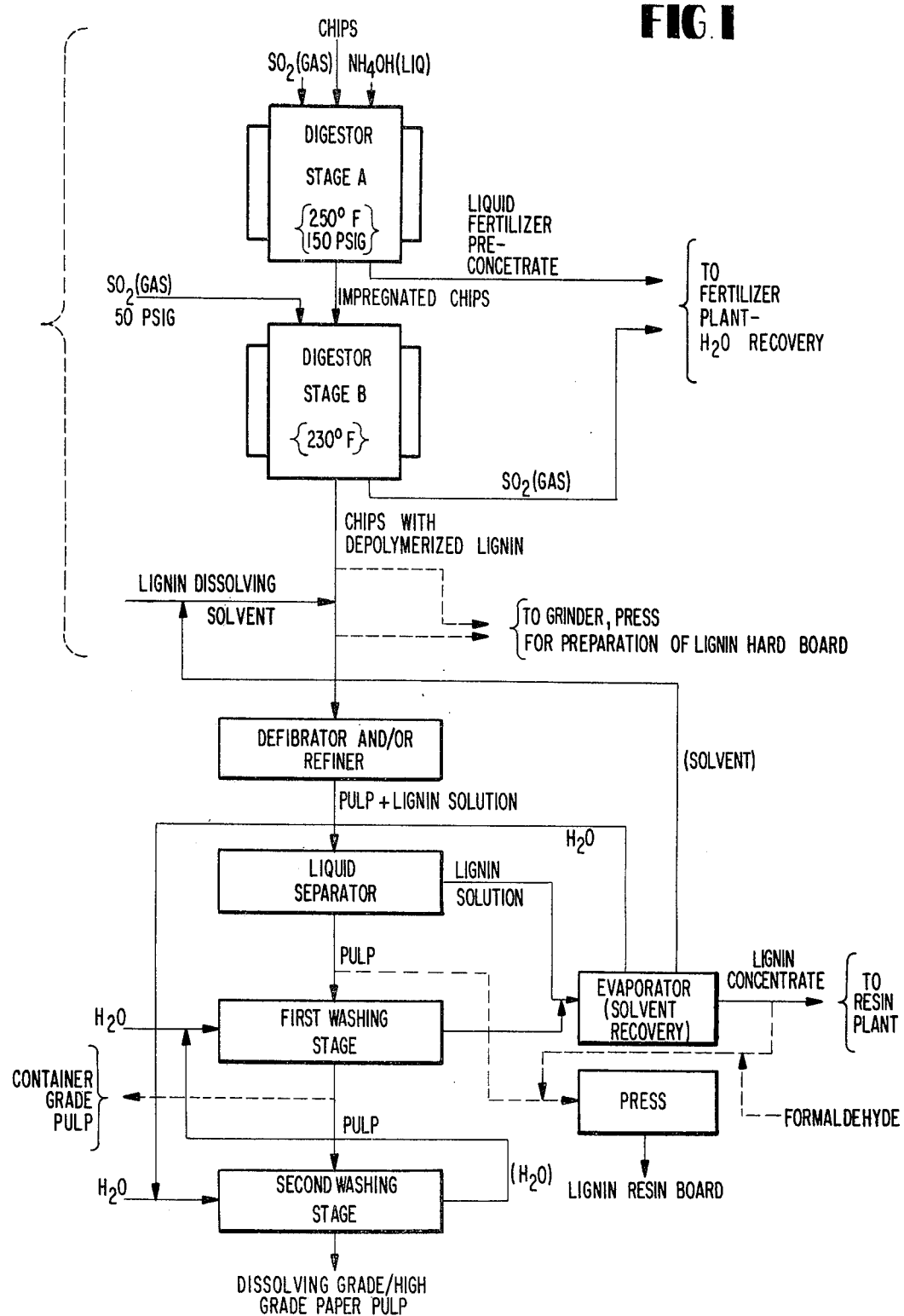
FIG. 1 is a typical flow sheet for the improved pulping process of this invention.

With attention to the drawings, and in particular to FIG. 1, the pulping process of this invention includes an essentially two-step batch digestion process which may be carried out in separate vessels continuously, or in one vessel, as will be subsequently explained. The starting materials are wood chips of any specie of wood, or woody material. Table I below illustrates representative woods which have been successfully pulped according to the process of this invention.

TABLE I

| Representative Wood Species Pulped By The New Fibers Process | | |
|---|---|---|
| Wood Species | Country of Origin | Region |
| 1. White Spruce | Canada | B. C. |
| 2. Lodgepole Pine | Canada | B. C. |
| 3. Loblolly Pine | U.S.A. | Southeastern |
| 4. Douglas Fir | U.S.A. | Washington |
| 5. Western Red Cedar | Canada | B. C. |
| 6. Western Hemlock | Canada | B. C. |
| 7. Yellow Poplar | Canada | B. C. |
| 8. Balsam Fir | Canada | B. C. |
| 9. Blue Gum | Brazil | So. America |
| 10. Ponderosa Pine | U.S.A. | Arizona |
| 11. Hemlock-Balsam 75:25 | Canada | B. C. |
| 12. Spruce-Douglas | U.S.A. | Washington |
| 13. Eucalyptus | Argentina | So. America |
| 14. Bagasse | U.S.A. | Louisiana |
| 15. Bagasse | Republic of China | Taiwan |
| 16. Oak | Canada | Ontario |

TABLE I-continued

Representative Wood Species Pulped By
The New Fibers Process

| | Wood Species | Country of Origin | Region |
|---|---|---|---|
| 17. | Southern Maple | Canada | Ontario |

The pulp produced may also be any of a wide variety of different pulps equivalent to the well-known grades produced according to the Kraft and Sulfite processes. Table II below lists eight of such pulps which have been produced according to the process of this invention without exhibiting a difference based on the specie of woods. The grade of pulp then has not been found to depend on or to be governed by the type of parent wood processed.

TABLE II

Representative Pulp Grades Produced By
The New Fibers Process

1. Dark Unbleached grade - simulated Kraft.
2. Semi-chemical grade - rapid pulping.
3. Unbleached cellophane grade.
4. Light colored unbleached - similar to semi-bleached Sulfite.
5. Medium colored unbleached and unbeaten.
6. Glossive type - highly beaten.
7. Bleached paper grade.
8. Bleached cellophane grade.

The New Fiber Pulping Process

In the process of this invention, the wood chips are compacted, but not heated or steamed, and fed into the digester of this invention, Stage A of FIG. 1. Ammonia and water, or preferably an ammonium hydroxide solution are then admitted to the digester which is maintained at a temperature of about 70° F. Sulfur dioxide gas is then pumped into the reactor until the internal pressure is approximately 50 p.s.i.g.

In an embodiment of this invention a steam jacketed reactor is utilized to provide the necessary heat within the digester. After the digester is sealed, steam is admitted to the jacket until the internal pressure within the digester measures at least 150 p.s.i.g., which compares to an internal temperature of about 250° F., or preferably about 200 p.s.i.g. and 270° F.

The temperature and pressure within the digester is maintained for a period of, for example, one hour to one and one-half hours, depending on the type of wood, to produce dissolving grade or paper grade pulp, or from 10 to 30 minutes to produce container grade pulp.

It should be emphasized that the pressure within the reactor must be at least 150 p.s.i.g. for efficient digestion and this pressure has been found to be essential to the digestion process. In addition, the design of the digester has also been found to be critical, and, the critical design features will be hereinafter discussed relative to FIGS. 3 and 4 of the drawings.

While ammonia gas could be used, ammonium hydroxide is a less expensive ingredient, and accordingly preferred for this reaction. In the preferred embodiment of this invention 10 liters of water and 100 milliliters concentrated ammonium hydroxide are utilized for each 5 pounds of chips charged to the digester Stage A.

When the desired time has elapsed the gaseous reactants in the digester are transferred to the recovery and storage system as will be subsequently explained, and, the liquid reactants are blown through a high pressure line to, for example, a fertilizer plant as also will be subsequently described. The impregnated chips from Stage A may remain in the digester vessel for Stage B processing, or may be transferred to a second digester vessel for the Stage B operation. In Stage B, sulfur dioxide gas is introduced into the digester at, at least, about 50 p.s.i.g. The digester is then heated to a temperature of at least 230° F. If it is desired to make dissolving grade or high paper grade pulp, the digester is maintained at a temperature of about 230° F. for at least about one-half hour. For container grade pulp the time may be maintained at from 10 minutes to about 30 minutes. During the digestion step as the sulfur dioxide gas reacts with the lignin molecules in the chips, the pressure within the vessel will be observed to decrease.

After expiration of the desired time to complete Stage B the unused $SO_2$ gas may be blown from the digester vessel to the fertilizer plant for processing, as also will be subsequently described. In the alternative, the gaseous reactants may again be transferred to the recovery system of this invention. Following Stage B the chips are soft, pliable, and wet, but they maintain their original outward appearance. If these chips are permitted to dry they will harden to their original consistency. The digested chips, however, may be ground and pressed if desired to form a lignin hardboard according to well known procedures.

A lignin dissolving solution is then added to the chip mass. The lignin dissolving solution preferred is a mixture of 500 mls. of monoethanolamine dissolved in 10 liters of water for each 5 pound charge of chips to the digester. Preferably this solvent is added in the digester vessel, and the mixture held therein for one-half to one hour under about 50 p.s.i.g. pressure and a temperature of up to 250° F. The solvent may, in the alternative, be added in the conduit or in the defibrator, as desired. The preferred lignin dissolving solution is monoethanolamine. However, other amines or other basic materials may be utilized. This solvent, however, will rapidly extract the lignin from the chip mass and is readily recoverable by distillation. If desired, the digested chips-solvent slurry may be conveyed to a grinder and the ground chips pressed into a lignin hardboard. The solvent, however, will have extracted a portion of the native lignin binder.

To pulp the digested chips, the chips-solvent mixture is defibrated. The defibrator may be any conventional agitating device such as a slurry pump which will slush the pulp whereby the solvent may efficiently extract the lignin therefrom. An example of a conventional slurry pump found to be a good defibrator is a Sala pump available from the Sala Machineworks, Ltd., Cooksville, Ontario, Canada.

If container grade pulp is being manufactured it may be necessary to refine the pulp in addition to or instead of defibrating. This may be achieved in the conventional manner by grinding the chip pulp mass between, for example, counter-rotating parallel plates. Good container grade pulp, however, has been produced with digestion times of 20 minutes per stage without subsequent refining.

The pulp and lignin solution slurry is then conveyed to a solid-liquid separator such as a centrifuge or screw press. The lignin solution separated therein is then conveyed to a solvent recovery device which may be a conventional latent heat evaporator wherein the solvent is distilled off and collected for reuse. If desired, the lignin solution may also be concentrated by evaporating off the excess water therein. The resulting lignin concentrate, a brown syrupy liquid, is then conveyed to the resin plant for processing into commercially usable materials as will be subsequently described. The concentrate will be observed to be noncorrosive and relatively odor free. In the alternative, the lignin-solvent solution may be diluted for example 1:1 with water and used as a wood impregnate for upgrading wood.

The pulp separated from the separator is then washed according to procedures well known in the art. If dissolving grade or high grade paper pulp is produced a two-stage washing is preferred. In the first washing stage the pulp is slurried in water. The slurry is then dewatered in a centrifuge or screw press. The waste water may be conveyed to the lignin solvent recovery evaporator wherein any solvent present will be reclaimed, the water purified for reuse by evaporation, and the remaining concentrate combined with the concentrate from the separator.

The pulp is then conveyed to a second washing stage where it is slurried with water, and then dewatered. The pulp from the second washing stage, as will be subsequently described, has been found to be superior dissolving grade or paper grade pulp. The waste water from the second washing stage may be returned to the first washing stage for reuse, if desired.

If container grade pulp is manufactured, by digesting for from 10 to 30 minutes per stage, this pulp is normally not washed. With container grade pulp the yield must be maximized and therefore refining may be necessary.

In the alternative, this pulp may be combined with lignin concentrate from the evaporator and formaldehyde and pressed to form a lignin resin board. A satisfactory lignin resin board may be made in a steam press at 900 p.s.i.g. pressure and about 30 pounds steam pressure. The lignin resin binder may be lignin concentrate from the evaporator mixed in equal parts with a 30 percent aqueous formaldehyde solution.

Whether the lignin resin board is formed from pulp and the lignin resin, or formed from the ground chips with depolymerized lignin therein, either before or after the lignin dissolving solvent is added, an adequate board may be made by subjecting the mass to about 900 p.s.i.g. and 30 pounds of steam in a steam press. It will be obvious to those skilled in the art that conventional equipment may be utilized to formulate a pressed hardboard in the conventional manner.

By-Products

The extracted lignin may also be utilized as a hardwood conversion resin. The concentrate from the evaporator admixed with equal parts of a 30 percent aqueous formaldehyde solution or the lignin-solvent solution alone or diluted with water may be sprayed or painted on or otherwise applied to softwood or low-grade hardwood. The material is absorbed into the wood and dries to form a hardened surface. In this way, the resin may be utilized either to upgrade low grade materials, or to stop checking or splitting of lumber. The hardwood conversion resin has been applied to a wide variety of different woods with equal success, and also may be utilized with plywood or particle board in a similar manner.

It has also been discovered that the lignin concentrate may be formulated into a glue. A typical glue will consist of the lignin concentrate, formaldehyde, and phenol. These materials may be combined 10 parts concentrate, 10 parts of a 30% formaldehyde solution, and 1 part phenol. The glue may also include any conventional filler, such as powdered cellulose. Phenol is added to provide thermosetting properties whereby the glue will be retained on the surface rather than absorbed by the porous material to be glued. This glue has been found to be an adequate laminate in the construction of plywood.

In summary then, the lignin concentrate and formaldehyde or lignin-solvent solution may be utilized as a hardwood conversion resin, and the concentrate may be utilized as a glue when admixed with formaldehyde and phenol. In the alternative, the lignin resin may be used as a binder with pulp to produce a lignin resin board. The lignin concentrate of this invention has not been found to vary in the aforementioned properties depending upon the type of parent wood utilized as a starting material, or the grade of pulp ultimately produced.

Figure 2:
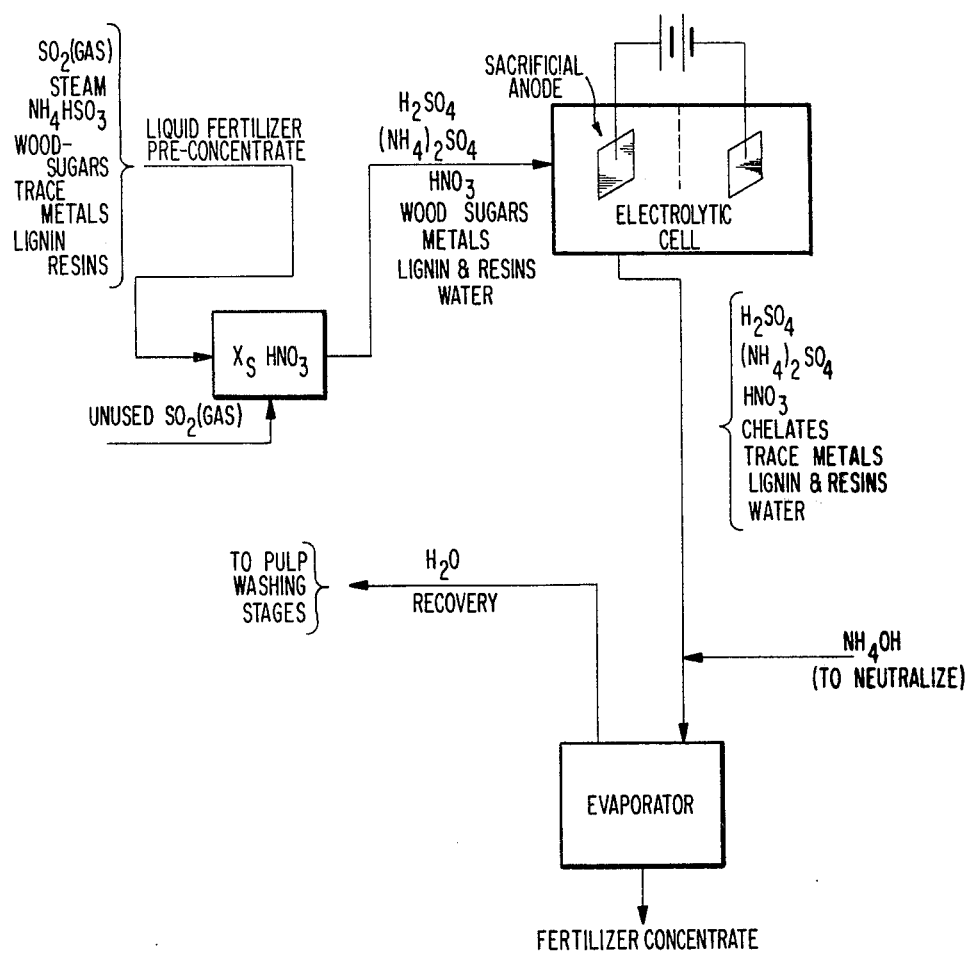
FIG. 2 is a flow chart for a typical fertilizer plant utilizing by-products of this invention.

With attention to FIG. 2, the by-products of Stage A and Stage B are also of value commercially. While the by-products could be easily processed to recover the ammonia and sulfur dioxide reactants, because these materials are low in cost and readily available, commercially, economic considerations may dictate utilization of the by-products as, for example, commercial fertilizer. It has been discovered that the liquid from Stage A as well as the gaseous by-products from Stage B may be readily processed to form a fertilizer base which through chelation can be tailored to provide specific minerals, as desired.

The liquid exhausted from Stage A includes some unused sulfur dioxide gas, steam generated from water inherent in the chip mass, ammonium bisulfite, and organic wood sugars and minor amounts of lignin resins together with trace metals from the wood. The ammonium bisulfite and sulfur dioxide gas may be readily converted to sulfuric acid and ammonium sulfate in the presence of excess nitric acid according to well known procedures obvious to those skilled in the art.

Typically the liquid material from Stage A is combined with an excess of nitric acid in a reactor vessel, and the unused sulfur dioxide from Stage B is bubbled through the reactor. The nitric acid acts as a sulfite converter to form a sulfate fertilizer base. The fertilizer base is then conveyed to, for example, an electrolytic cell having a sacrificial anode to add metal ions to the solution. The metal ions then chelate with the organic constituents from the wood. Depending upon the anode utilized, the chelates will supply minerals desired to make up soil deficiencies. For example, zinc metal will readily ionize and chelate with the organic constituents of the solution to form a zinc chelate fertilizer.

The fertilizer preconcentrate from the electrolytic cell may then be neutralized with, for example, ammonium hydroxide and conveyed to an evaporator. In the evaporator excess water may be removed according to conventional techniques and utilized in the pulp washing stages. The fertilizer concentrate is then available for shipment and use.

It will be obvious to those skilled in the art that other means may be used to convert ammonium bisulfite to ammonium sulfate and sulfur dioxide to sulfuric acid. For example, the reaction with nitric acid may be eliminated, and the materials from Stages A and B conveyed directly to an electrolytic cell generating ferric ion. Ferric ion could then be utilized as the oxidizing agent for the sulfur compounds.

In addition, if desired, the evaporator may be eliminated and the dilute fertilizer solution used. In this instance, however, as will be obvious to those skilled in the art, shipping weight would militate against use of the dilute fertilizer in locations remote from the fertilizer plant.

The Digester Vessel

With attention to FIGS. 3 and 4, it has been found that the design of the digester vessel is critical to the process of this invention. FIG. 3 illustrates an embodiment of the vessel 10, and FIG. 4 illustrates a preferred alternate embodiment 10'.

The vessel comprises a generally cylindrical inner wall 12. Wall 12 serves as the inner wall of a vapor jacket 14. The outer wall 16 of vapor jacket 14 is preferably welded in sealing engagement to inner wall 12 at the upper and lower extensions 18 and 20, respectively, of wall 12. The central portions 12' of wall 12 between extensions 18 and 20 is foraminous to allow communication between the interior of jacket 14 and the chip mass as will be explained.

The upper portion 18 of wall 12 terminates in an entrance port 22 which is adapted to be sealed by a cover (not shown) which may be bolted to supporting flange 24.

The lower extension 20 of wall 12 terminates in a mounting flange 26 which mounts a first gate valve 28 therebelow and its housing 30 at a mating flange 31. The housing 30 for gate valve 28 is a generally cylindrical extension 30 having a port 32 therein. Ports 34 and 34' are also provided on the upper and lower extensions of vapor jacket wall 16, 36 and 36', respectively, where these extensions are joined to the upper and lower extensions 18 and 20 of the inner wall 12. In addition, a conventional slightly larger port 38 is provided on wall 16 which may be used as a thermowell to receive conventional temperature and pressure monitoring devices. Port 34 is utilized to admit the gaseous and liquid reactants to the vapor jacket.

As will be obvious to those skilled in the art, the digester vessel of this invention may be heated by any conventional heating source. In the preferred embodiment, a steam jacket 40 is utilized having inlet and outlet ports 42 and 44 through the outer wall 45 thereof. The outer wall 16 of the vapor jacket serves as the inner wall of the steam jacket 40.

It has been discovered that it is essential to the digestion process of this invention that the chip mass be enclosed in a vapor dome in order that the gaseous and liquid reactants may circulate freely above, below and on all sides of the said mass. In the embodiment of FIG. 3 the chip mass is enclosed in a mesh basket 46. The basket is dimensioned to fit inside the inner wall 12 of vapor jacket 14. The basket is provided with a false bottom 48 for supporting the chip mass. Bottom 48 is preferably constructed of open mesh. In addition a solid bottom 50 is provided, and the lower portion 50 may be conveniently adapted to rest on gate valve 28. A handle means 52 is also provided. The chip mass then will be disposed between the mounting ring 54 for handle means 52 and the false bottom 48 so that the mass will be in communication with the liquid and gaseous reactants admitted through port 34 in vapor jacket 14 and disposed centrally to the foraminous portion 12' of wall 12. The reactants must be free to circulate upwardly through the chip mass, through the sides and downwardly through the mass for even penetration throughout. In addition, the chip bed must be entirely enclosed within the heating means, steam jacket 40, so that the mass will be uniformly heated throughout.

With reference to FIG. 4, in the preferred embodiment of this invention the basket 46 is not utilized. Instead, a gate valve 56 is disposed within digester 10' at a level approximating that of the false bottom 48 in the basket, the embodiment of FIG. 3. Gate valve 56 includes a transverse plate 58 adapted to extend perpendicularly to the longitudinal axis of the inner wall 12 of vapor jacket 14, and, when closed, between the inner surface of cylindrical wall 12 to support the chip mass thereabove.

Plate 58 includes a plurality of holes 60 adapted to permit free flow of liquid and gaseous reactants therethrough into and out of the chip mass. Plate 58 is supported by a housing 62 adapted to extend through the steam jacket wall 45, and the walls 12 and 16 of vapor jacket 14. As will be obvious to those skilled in the art, housing 62 is mounted in sealing engagement with walls 12, 16, and 45.

Gate valve 28 is also mounted below extension 30 to control the outlet port 64 as in the embodiment of FIG. 3. A mounting flange 66 and a mounting plate 68 are also provided to support the device. Both gate valves 28 and 56 may be manually operated, or, in the alternative, may be adapted to automatic controls in any well known fashion.

Either digester 10 or 10' is adapted to be mounted in series on a similar unit as shown in FIG. 5. In this instance flange 68 would be bolted to a corresponding flange similar to flange 24 with an appropriate gasket to seal the connection. In this arrangement Stage A and Stage B digestion is carried out in separated units, simultaneously, with different batches of chips for continuous batch operation.

To operate the device of the digester of FIG. 3, the chip mass is enclosed in the basket 46 and lowered into the vapor jacket 14 through port 22 after liquid reactants have been admitted through port 34. Sufficient liquid should be used to cover the chip mass. The cover (not shown) is then affixed to seal inlet port 22, and the gaseous reactant admitted through port 34. Port 34 is then sealed and steam is admitted to steam jacket 40, and the temperature and pressure within vapor jacket 14 monitored by conventional temperature and pressure gauges (not shown) sealed in port 38.

When the desired time has elapsed, the gaseous reactants may be expelled from digester 10 through, for example, port 34 and conveyed to storage or a plant for further processing. Gate valve 28 is then partially opened to permit the flow of liquid reactants through port 64 into a second stage vessel (not shown) identical to vessel 10. Valve 28 is then fully opened and the basket 46 permitted to drop through port 64 into the second stage vessel for Stage B processing. The used liquid serves merely to cushion the impact of the basket on valve 50 of this vessel. As discussed with relation to FIGS. 1 and 2 above, the used liquid reactants are ultimately conveyed in a conventional manner to, for example, a fertilizer plant for further processing.

The basket 46 of impregnated chips from Stage A may alternatively be raised through inlet port 22 and conveyed to a second, identical, detached digester vessel, if desired. Or, the vessel used for Stage A may be reused for Stage B. In this case, the used gaseous and liquid reactants are expelled sequentially through ports 34 and 64, respectively.

Sulfur dioxide gas is then admitted through port 34 for Stage B digestion. Upon the completion of Stage B the gaseous reactants are expelled through for example port 34' and recovered for storage or conveyed to the fertilizer plant for processing. The valve 28 is then opened and the basket permitted to drop through the outlet port 64. The chips are then conveyed to the basket to a defibrator whereupon the basket is emptied thereinto, and the chips slurried and defibrated with the lignin dissolving solvent as described above.

With relation to the alternate preferred embodiment of FIG. 4, gate valve 56 is closed, and chips are then admitted through the inlet port 22 until the chip bed level reaches a desired height. The top cover (not shown) is then attached over inlet 22 and the procedure for Stage A described above is implemented. Upon the completion of the procedure for Stage A, the gaseous reactants may be conveyed to the recovery system of this invention for storage or through the system to the fertilizer plant. The gate valve 28 is then opened and the liquid reactants are conveyed through port 64 to the fertilizer plant.

Valve 28 may then be closed, and sulfur dioxide gas according to Stage B is admitted to the vapor jacket through port 34. Upon completion of Stage B, the unused sulfur dioxide gas is conveyed from for example port 34' to the fertilizer plant, and both gate valves 28 and 56 opened. The chips are then blown from the digester 10' and conveyed by any conventional means to the defibrator where they are slurried in the lignin dissolving solution as above described.

As in the case of the embodiment of FIG. 3 a second vessel 10' may be mounted at flange 68, coaxially with vessel 10'. Stage A and Stage B may then be carried out in separate vessels according to the procedure described above.

It has also been discovered that the process of this invention may be interrupted at any time without losing the chip batch. The process may then be resumed to completion so long as the chips have not dried. If the chips have dried, the process is merely started again.

It will be obvious to those skilled in the art that the used liquid and gaseous reactant materials, by-products of Stage A and Stage B digestion, need not be conveyed to a fertilizer plant but may be used in any fashion obvious to those skilled in the art, or may be conveyed to a recovery plant for recovery of the ammonia and sulfur dioxide for reuse.

It will also be obvious to those skilled in the art that although the digester vessel shown in FIGS. 3 and 4 is cylindrical, it may be constructed in a variety of shapes so long as the chip bed is maintained in a vapor dome surrounded above and below by both the vapor jacket, and the steam jacket. The digester, in addition, may be of any convenient size from a few feet in height, to at least 60 feet or so in height, without substantial alteration of the procedures for the process of this invention. In fact, if a digester having a height of 60 feet, and an inside diameter of the vapor jacket of 2 feet, is used with the process of this invention about 100 gallons of water per ton of oven-dry pulp produced will be gained, more than enough for process needs without an external water supply for other than start-up conditions.

Anti-pollution Chemical Recovery System

Figure 6:
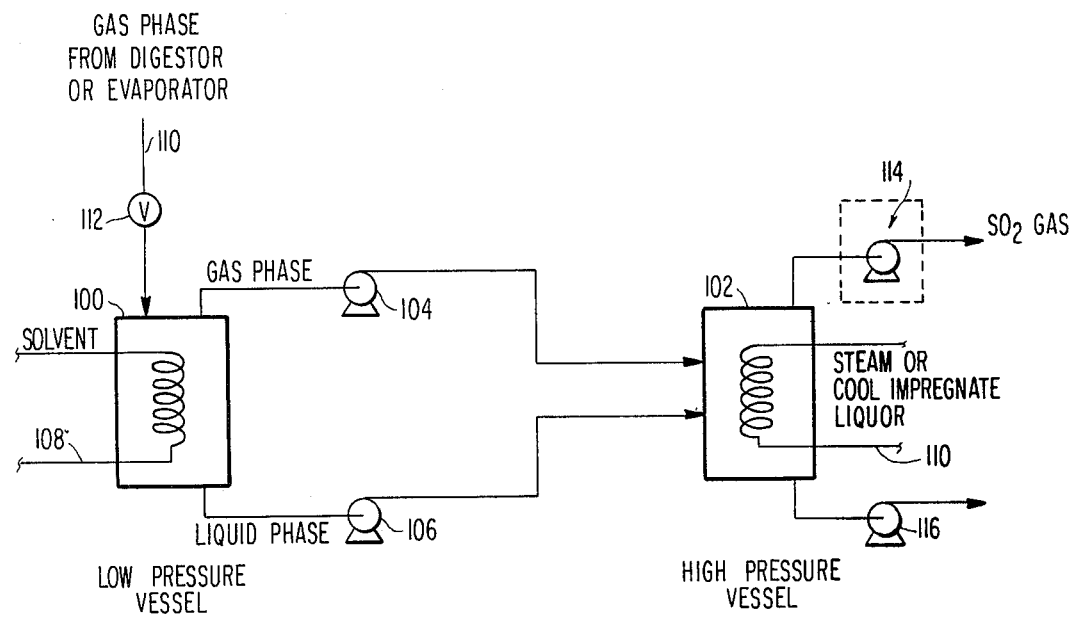
FIG. 6 is a schematic of the chemical recovery system of this invention.

With reference to FIG. 6, the anti-pollution chemical recovery system of this invention consists of a low-pressure vessel 100, a high-pressure vessel 102 and, respectively, gas and liquid phase pumps 104 and 106 which interconnect said vessels. In a preferred embodiment, both vessels 100 and 102 have internal coils 108 and 110 through which the vessels are able to selectively function as heat exchangers in addition to storage vessels.

As will be obvious to those skilled in the art, following Stage A digestion it would be desirable to rapidly remove the unused reactants or liquid and gaseous reactant by-products so that either Stage B may be carried out in the same vessel, or the impregnated chips may be conveyed to a second vessel for Stage B digestion, without loss of the liquid and gaseous reactants in the vessel. If the digester is merely vented to a storage vessel, the pressures in the two vessels will equalize and complete transfer of the gaseous reactants will not occur. Furthermore, as the pressures approach equal values, the rate of the transfer will rapidly decrease.

Accordingly, the anti-pollution chemical recovery system of this invention functions to rapidly remove the gaseous reactants from the digester vessel for storage.

In one embodiment of this invention, following Stage B digestion, or the second digestion step, the lignin dissolving solution is added directly to the digested chips in the digester, as will be subsequently described, for a cooking step prior to defibrating or refining. In this embodiment, it is desirable to rapidly remove the gaseous reactants from the digester before adding the lignin dissolving solution. The Anti-pollution Chemical Recovery System of this invention will rapidly remove the gaseous reactants for storage so that the lignin dissolving solvent may be added for a final cooking step without substantial delay.

The Anti-pollution Recovery System of this invention in general functions as follows: line 110 connects the digester or, if desired, the evaporator, to the low-pressure vessel 100. A pressure relief valve 112 is provided in line 100 so that when the valve is opened, the gaseous reactants under pressure in the digester will flow through the line and into the empty low-pressure vessel 100. The reactants are principally steam and sulfur dioxide gas. When the pressure within the low-pressure vessel 100 increases to, for example, a predetermined value approaching that of the pressure within the digester, valve 112 is closed either manually or automatically in response to a pressure sensor (not shown) in the low-pressure vessel 100. The gas phase within the vessel is then pumped by pump 104 to high-pressure vessel 102 for storage. Considering that the steam condenses to some extent within low-pressure vessel 100, a liquid phase will also be present within the vessel. Accordingly, pump 106 continually pumps the liquid phase also to the high-pressure vessel 102 for storage.

When the pressure within vessel 100 reaches zero, pump 104 will be turned off, and valve 112 opened so that pressure within the digester will again cause gaseous contents to vent into the vessel 100. This procedure is carried out stepwise or incrementally until pressure within the digester reaches zero. The gaseous contents then flow from the digester to the low-pressure vessel based on a pressure differential maintained between the vessels. By closing the line 110 periodically and removing the incremental gas phase within the vessel, the pressure differential is maintained at a maximum for maximum speed in removing the contents from the digester or evaporator.

In order to facilitate condensation of steam present in the digester, the coil 108 within low-pressure vessel 100 may contain for example, the lignin dissolving solvent to be used in the next step of the process. If cold solvent is present in a coil 108, it will take up heat and may then be admitted to the digester for the cooking step noted above at a higher temperature.

Vessel 102 will then store water condensed from steam and dissolved gases such as sulfur dioxide and/or ammonia as well as a gaseous phase. The liquid in the high pressure vessel, however, normally contains a predominate quantity of dissolved sulfur dioxide gas. The coil 110 in vessel 102 may initially contain, for example, cool impregnate liquor for a subsequent Stage A or first stage digestion step. As the liquid and gaseous phases from the low-pressure vessel are transferred to the high-pressure vessel, the impregnate liquor will take up heat in vessel 102 for subsequent first stage digestion.

For second stage digestion, steam is admitted to coil 110 which causes the dissolved sulfur dioxide to enter the gaseous phase under high pressure of up to, for example, 600 pounds per square inch. The gas may then be vented to the digester for Stage B digestion. An optional pump 114 may be provided if desired. The liquid within vessel 102 may be conveyed by pump 116 to the fertilizer plant or to an evaporator for steam generation, or to wash water as desired.

Accordingly, the Anti-pollution Recovery System of this invention is designed to achieve rapid transfer of the gaseous phase from the digester or from an evaporator, to make maximum utilization of heat content of the gaseous phase, and to provide a storage vessel for recovered chemicals, principally sulfur dioxide for reuse.

The following is an example of a typical cook utilizing the Anti-pollution Recovery System of FIG. 6:

As noted above the cooking time for Stage A impregnation and Stage B digestion will vary with the grade of pulp to be produced, and with the type of parent wood. The maximum total cooking time for Stages A and B for any pulp probably would never exceed about 3 hours. A high-grade chemical pulp can normally be produced with, for example, a Stage A digestion of 1½ hours at 275° F. and 200 p.s.i.g. pressure in the digester vessel of this invention. A Stage B digestion then would follow with a ½ hour cook under the gas, and after removal of gas from the digester vessel, the lignin dissolving solvent could be added directly to the digester vessel and maintained under a pressure of about 50 pounds of steam for a period of up to about an hour. Following this step, the chips and solvent would be conveyed to defibrator and liquid separation as discussed above.

At the expiration of a Stage A cook, the digester vessel would be of a pressure of 200 p.s.i.g. and a temperature of 275° F. The low-pressure vessel 100 would be at zero p.s.i.g. and about 40° F. The lignin dissolving solvent would be maintained in the coil 108 in the low-pressure vessel 100. In order to transfer the gaseous reactants from the digester vessel, the line 110 would normally be placed in communication with port 34 to receive gaseous reactants from the digester vessel.

When relief valve 110 is opened, the pressure in the digester vessel will drop after about three minutes to about 150 p.s.i.g. while the pressure in vessel 100 will rise to about 30 p.s.i.g. Steam will begin to condense in the vessel 100. Typically, the valve 112 will then be closed and pumps 104 and 106 energized. Valves (not shown) may be used in the lines upstream of the pumps as will be obvious to those skilled in the art. After a few seconds, the pump 104 will have pumped the gas from vessel 100 to vessel 102 and pressure in vessel 100 will return to zero. The pump 104 is then de-energized. It has been found that pump 106 preferably will be allowed to pump continuously during the operation. Valve 112 is then opened, and the process repeated.

As will be obvious to those skilled in the art, this procedure will very rapidly bring the pressure within the digester vessel to zero, and will heat the solvent in coil 108 within vessel 100. Normally coil 110 in vessel 102 will contain cool impregnate liquor for Stage A of a subsequent digestion. This liquor will also be heated by the liquid and gaseous phases admitted to vessel 102.

When pressure within the digester reaches zero, steam will be admitted to the digester up to a pressure of about 25 p.s.i.g. and the spent liquid reactants within the digester will be blown through port 34' to the fertilizer plant.

For Stage B operation, sulfur dioxide gas will be admitted to the digester until the pressure therein is up to about 100 pounds with hot $SO_2$ gas. Steam is then used to raise the pressure to 200 p.s.i.g. for about ½ hour.

The spent cooking liquor from Stage A may be blown to an evaporator previously charged with an excess of ammonium hydroxide over that necessary to neutralize the sulfur dioxide in the liquid. The reaction between the liquid and the ammonium hydroxide is endothermic. Sulfuric acid may then be added in an amount excess over that necessary to neutralize the ammonium to thereby form ammonium sulfate. The sulfur dioxide present will also form ammonium sulfite. As will be obvious to those skilled in the art, sulfur dioxide may be recovered from the spent liquor in the evaporator by steam stripping to remove the dissolved gas. The vapors from the evaporator are then primarily sulfur dioxide and steam and these vapors are conveyed through line 110 to the low-pressure vessel and from there to the high-pressure vessel for storage.

To begin a Stage B cook, steam is admitted through the coil 110 is high-pressure vessel 102 to raise the temperature therein until the dissolved sulfur dioxide gas leaves the solution and enters the gaseous phase. When the pressure reaches about 600 p.s.i.g. in vessel 102, the $SO_2$ gas may then be vented to the digester for the Stage B cook.

At the conclusion of the Stage B cook, the gaseous reactants from within the digester are conveyed through line 110 to the low-pressure vessel 100 and from the low-pressure vessel 100 to the high-pressure vessel 102 for storage as described above. The hot lignin dissolving solvent from coil 108 is then admitted to the digester vessel with steam pressure of up to about 50 pounds for about ½ hour to produce a high grade chemical pulp after liquid separation, washing, and refining.

New Fiber Pulp

In order to evaluate the pulp produced according to the process of this invention, a "hembal" pulp, 75% hemlock, 25% balsam fir, was prepared and evaluated against a control of Sulfite pulp. Table III below summarizes the results of this evaluation.

As shown by the above results, the new fiber pulp exhibited strength characteristics closer to Kraft pulp than Sulfite pulp in every respect. However, the Kappa number of the above new fiber sample was found to be 93.4 compared to the control Sulfite number of 20.32. The normal conclusion from this would indicate that the new fiber sample had a high lignin content. However, visual examination showed that the new fiber pulp sheets were light in color.

Although this evaluation was carried out in accordance with the TAPPI and the Pulp and Paper Research Institute of Canada Standard Procedures, conventional chemical pulp tests applied were not applicable to this new pulp in every respect. The strength characteristics exhibited were good, and once again superior to Sulfite pulp in every respect.

Follow-up tests were then carried out to verify the physical strength evaluations, and these tests are presented below.

wood. The comparison data are typical for North American Mills, and are summarized below.

The observation that lignin was readily removed from the pulp, coupled with a high yield figure above, supports the theory that the process of this invention preferentially attacks the bonds binding the lignin to the cellulose without substantial damage to either the hemicellulose or α-cellulose fractions.

TABLE III

| TEST | *NEW FIBERS PULP | | | | CONTROL, SULFITE PULP | | | |
|---|---|---|---|---|---|---|---|---|
| Beating Revs. | 5,115 | 4,000 | 2,625 | 1,150 | 3,792 | 2,6000 | 1,713 | 813 |
| Freeness | 300 | 400 | 500 | 600 | 300 | 400 | 500 | 600 |
| Burst Factor | 66 | 68 | 65 | 56 | 58 | 53 | 43 | 29 |
| Tear Factor | 75 | 77 | 80 | 88 | 83 | 88 | 97 | 110 |
| O-Span | 16,954 | 17,950 | 18,000 | 17,800 | 16,100 | 15,700 | 15,050 | 14,250 |
| Breaking Length | 10,020 | 10,250 | 9,950 | 9,000 | 9,350 | 8,550 | 7,400 | 5,700 |
| Bulk | 1.40 | 1.43 | 1.48 | 1.58 | 1.35 | 1.40 | 1.49 | 1.61 |
| Drain Time (Sec.) | 7.0 | 6.0 | 4.8 | 4.0 | 10.0 | 7.0 | 5.0 | 4.0 |

The weight of the total oven dry fiber was: 164.21 g.
The weight of the screened oven dry fiber was: 142.51 g.
The weight of the oven dry rejects were: 21.70 g.
*"Hembal" 75% Hemlock 25% Balsam Fir

TABLE V

| PULP YIELD DETERMINATION TESTS - NEW FIBERS PULP | | | | | |
|---|---|---|---|---|---|
| | Native Lignin Content % | Total Cellulose content % | Extractives and Ash % | Yield % | Efficiency of pulping |
| Douglas Fir | 28.0 | 69.8 | 2.2 | 63.0 | 90.0 |
| Northern Poplar | 18.2 | 78.9 | 2.9 | 72.0 | 91.5 |
| Western Hemlock | 29.3 | 68.7 | 2.0 | 66.0 | 94.1 |
| Comparative Figures on Standard Kraft Pulp (Typical for North American Mills) | | | | | |
| Douglas Fir | | | | 48.0 | 69.5 |
| Northern Poplar | | | | 55.0 | 70.0 |
| Western Hemlock | | | | 51.0 | 71.0 |

TABLE IV

| PHYSICAL STRENGTH EVALUATION OF NEW FIBERS UNBLEACHED PULPS | | | | | | |
|---|---|---|---|---|---|---|
| SAMPLE NO. | 1 | | | 2 | | |
| Freeness (C.S.F.) | 652 | 500 | 300 | 636 | 500 | 300 |
| Beating Revs. (P.F.I.) | 0 | 1,700 | 3,950 | 0 | 1,500 | 3,000 |
| Burst Factor | 54 | 80 | 92 | 48 | 74 | 83 |
| Tear Factor | 135 | 94 | 83 | 114 | 87 | 78 |
| Break L. (M) | 7,320 | 10,500 | 11,200 | 6,854 | 9,800 | 11,000 |
| Bulk (CC/GM) | 1.49 | 1.36 | 1.30 | 1.50 | 1.35 | 1.27 |
| Elrepho Brightness | 27.90 | — | — | 32.60 | — | — |
| Drain Time (Sec.) | 4.10 | 5.00 | 9.10 | 4.10 | 5.40 | 8.30 |
| Zero (M) | 15,827 | — | — | 15,047 | — | — |

These data verify that the digester and process of this invention produce new fiber pulp with consistent quality.

In order to evaluate the yield, three pulps were prepared according to the process of this invention and the yield and efficiency of the pulping operation evaluated. These results were then compared with standard yield and efficiency figures for Kraft Pulp from the same Pulp samples were also submitted to testing for α, β and γ cellulose percentage together with a physical evaluation of the unbleached pulp characteristics, and the results thereof are presented below in Table VI.

The physical strength properties of the pulp in these evaluations were again found to be superior to market Sulfite pulp in every respect and closer to Kraft pulp in paper strength characteristics.

The results are summarized below in Table VI, and the comparison is shown in Table VII.

As shown above the O-span tensile breaking strength, which is an indication of the individual fiber strength is as good as some Kraft pulp at the original freeness level. The α cellulose contents of the unbleached pulps were found to be higher than expected due to production by the process of this invention.

In order to evaluate the bleaching response, bleached physical properties, and α content of the bleached pulp, 50 grams of oven-dry equivalent of the screened, unbleached pulps were used for a C—E—H—H bleaching sequence (C=chlorination, E=caustic extraction, H=hypochlorite). See Tables VIII, IX, and X.

The bleached pulps were also processed in a laboratory P.F.I. mill to three freeness levels and the bleached physical strength properties determined as shown below in Table XI.

TABLE VI

| Physical Evaluation Data of New Fiber Paper Grade Unbleached Pulp | | | | | | |
|---|---|---|---|---|---|---|
| Sample | 1 | | | 2 | | |
| Freeness (C.S.F.) | 652 | 500 | 300 | 636 | 500 | 300 |
| Beating Revs. (P.F.I.) | 0 | 1,700 | 3,950 | 0 | 1,500 | 3,000 |
| Burst Factor | 54 | 80 | 92 | 48 | 74 | 83 |
| Tear Factor | 135 | 94 | 83 | 114 | 87 | 78 |

TABLE VI-continued

Physical Evaluation Data of New Fiber Paper Grade Unbleached Pulp

| Sample | 1 | | | 2 | | |
|---|---|---|---|---|---|---|
| Breaking Length (M) | 7,320 | 10,500 | 11,200 | 6,854 | 9,800 | 11,000 |
| Bulk (cc/GM) | 1.49 | 1.36 | 1.30 | 1.50 | 1.35 | 1.27 |
| Elrepho Brightness | 27.9 | — | — | 32.60 | — | — |
| Drain Time (Sec.) | 4.1 | 5.0 | 9.1 | 4.1 | 5.4 | 8.3 |
| Zero Span Tensile Breaking Length (M) | 15,827 | — | — | 15,047 | — | — |
| % Alpha Cellulose | 90.73 | — | — | 89.71 | — | — |
| % Beta Cellulose | 0.79 | — | — | 1.86 | — | — |
| % Gamma Cellulose | 8.48 | — | — | 8.43 | — | — |
| % Screen Rejects | 0 | — | — | 0 | — | — |
| Viscosities (CPSO) | — | — | — | — | — | — |

TABLE VII

Comparison of Two New Fiber Pulps With Market Sulfite Pulp Strength Properties

| Sample | 1 | | | 2 | | | Marker Sulfite | |
|---|---|---|---|---|---|---|---|---|
| Freeness (C.S.F.) | 652 | 500 | 300 | 636 | 500 | 300 | 500 | 300 |
| Beating Revs. (P.F.I.) | 0 | 1,700 | 3,950 | 0 | 1,500 | 3,000 | 1,713 | 3,792 |
| Burst Factor | 54 | 80 | 92 | 48 | 74 | 83 | 43 | 58 |
| Tear Factor | 135 | 94 | 83 | 114 | 87 | 78 | 97 | 83 |
| Breaking Length (M) | 7,320 | 10,500 | 11,200 | 6,854 | 9,800 | 11,000 | 7,400 | 9,350 |
| Bulk (cc/GM) | 1.49 | 1.36 | 1.30 | 1.50 | 1.35 | 1.27 | — | — |
| Elrepho Brightness | 27.9 | — | — | 32.60 | — | — | 30.0 at no beating | |
| Drain Time (Sec.) | 4.1 | 5.0 | 9.1 | 4.1 | 54. | 8.3 | — | — |
| Pemanganate No. | 15.0 | — | — | 8.0 | — | — | 13.6 at no beating | |

TABLE VIII

BLEACH CONDITIONS, CHLORINATION STAGE

| Sample | 1 | 2 |
|---|---|---|
| % Cl₂ on Pulp | 4.0 | 2.0 |
| Reaction Temp. °C. | 20.0 | 20.0 |
| Reaction Time, Min. | 60.0 | 60.0 |
| Reaction Consistency, % | 3.0 | 3.0 |
| Residual pH | 1.95 | 2.25 |
| Residual Cl₂ on Pulp, % | 0.34 | 0.17 |

TABLE IX

BLEACH CONDITIONS, CAUSTIC EXTRACTION

| Sample | 1 | 2 |
|---|---|---|
| % NaOH on Pulp | 2.5 | 2.5 |
| Reaction Temp. °C. | 70.0 | 70.0 |
| Reaction Time, Min. | 120.0 | 120.0 |
| Reaction Consistency, % | 10.0 | 10.0 |
| Residual pH | 12.35 | 12.40 |
| Residual NaOH on Pulp, % | 1.11 | 1.27 |

TABLE X

BLEACH CONDITIONS, FIRST HYPO STAGE

| Sample | 1 | 2 |
|---|---|---|
| % Hypo on Pulp as Cl₂ | 1.0 | 1.0 |
| Reaction Temp. °C. | 35.0 | 35.0 |
| Reaction Time, Min. | 120.0 | 120.0 |
| Reaction Consistency, % | 10.0 | 10.0 |
| Residual pH | 7.60 | 7.50 |
| Residual Hypo on Pulp as Cl₂, % | 0.35 | 0.29 |

Second Hypo Stage

| | | |
|---|---|---|
| % Hypo on Pulp as Cl₂ | 1.0 | 1.0 |
| Reaction Temp. °C. | 35.0 | 35.0 |
| Reaction Time, Min. | 120.0 | 120.0 |
| Reaction Consistency, % | 10.0 | 10.0 |
| Residual pH | 7.30 | 7.00 |
| Residual Hypo on Pulp as Cl₂, % | 0.37 | 0.27 |

TABLE XI

PHYSICAL EVALUATION DATA OF NEW FIBER PAPER GRADE BLEACHED PULP

| Sample | 1 | | | 2 | | |
|---|---|---|---|---|---|---|
| Freeness (C.S.F.) | 687 | 500 | 300 | 692 | 500 | 300 |
| Beating Revs. (P.F.I.) | 0 | 1,525 | 2,830 | 0 | 780 | 1,775 |
| Burst Factor | 12.1 | 18.0 | 44.0 | 10.1 | 18.5 | 27.0 |
| Tear Factor | 221 | 90 | 67 | 184 | 105 | 61 |
| Breaking Length (M) | 2,330 | 5,550 | 6,650 | 2,205 | 3,800 | 5,400 |
| Bulk (cc/GM) | 1.98 | 1.53 | 1.42 | 2.01 | 1.75 | 1.49 |
| Elrepho Brightness | 88.7 | — | — | 89.3 | — | — |
| Opacity % (Printing) | 74.7 | 69.0 | 67.5 | 76.0 | 73.5 | 71.2 |
| Drain Time (Sec.) | 3.7 | 4.6 | 6.0 | 3.8 | 4.4 | 5.4 |
| Zero Span Tensile Breaking Length (M) | 11,983 | — | — | 9,748 | — | — |
| 1% C.E.D. Tappi Viscosity (Cps) | 4.2 | — | — | 3.2 | — | — |
| % Bleaching Yield | 93.28 | — | — | 95.06 | — | — |
| % Alpha Cellulose Content | 77.3 | — | — | 72.4 | — | — |

It should be noted that good residuals during the bleaching stages indicated that the chemical application was correct, however, in the extraction stage the caustic on pulp proved to be twice as much required which caused some degradation. Both bleached pulps were tested at the same freeness levels as the unbleached pulps. Tear at 0 beating was improved by about 40 percent on Sample No. 1 and by about 38 percent on Sample No. 2 over unbleached pulp. At other freeness levels the tear was just slightly lower than unbleached.

The results were found to be very similar to values reported in the literature for spruce. Brightness was found to be only about 1.5 below the ultimate for Western Hemlock. 0-span tensile strength was found to be good and well within the range for Sulfite pulps. The α-cellulose, however, was lowered 14-19 percent by being bleached too severely. By utilizing a mild bleaching this dissolving grade parameter was improved substantially.

In summary, as shown by the above evaluations, the process of this invention produces dissolving grade and paper grade pulp superior to Sulfite, and produces pulp having physical properties nearly equivalent to Kraft. However, the pulp is produced in a higher yield, and does not follow standard behavior patterns during bleaching.

Only a mild bleach has been found to be required, as shown by the above data, in order to prepare high grade bleached pulp in substantially improved yields. Because the pulp quality has not been found to depend upon the wood specie pulped and the process does not require an external source of water, the process is adaptable to use in any region desired. Furthermore, a large capacity plant is not essential for economic operation.

Therefore, the process of this invention is adaptable for use in arid or semi-arid regions with even marginal stands of timber. Because the process is not polluting, the process may be adapted for use in populated areas without regard for environmental standards which severely restrict prior commercial Sulfite or Kraft operations.

Defibrated Wood Chips

It has also been discovered that the process of this invention may be adapted to permit disposal of difficultly disposable wood waste, the by-products of, for example, sawmills. As is well known to those skilled in the art, cedar wood is widely used for rough construction, fence posts, and many other uses. Cedar chips, however, present a difficult disposal problem. Open burning in many areas is prohibited, and where permitted is difficult. As is well known, cedar has tremendous water-holding properties, and therefore, burning the chips can only be achieved with a flammable liquid, such as oil. The chips are not normally used for landfill because toxic extractants leach from the chips which tend to poison the soil. Therefore, cedar sawmill waste presents a particular disposal problem.

However, according to the process of this invention, it has been discovered that if cedar chips are subjected to Stage A cooking only for from ½ to 1 hour at up to about 275° F. and then removed from the digester without subjecting the chips to Stage B, the chips may be defibrated. Specifically, after Stage A processing, the chips are chopped in a high-speed defibrator such as a Waring blender. Instead of chopping to powder, as would be expected, the chips defibrate and produce a loose fibrous material. The cedar fiber material then has commercial value as for example, packing material or insulation.

Accordingly, cedar chips may be disposed of according to the process of this invention by subjecting the chips to Stage A processing only followed by defibration. The fibers will separate so that upon drying, the material consists of a loose fibrous mass which may be used as insulation, packing material or the like.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A pollution-free process for producing wood pulp in any desired grade from any desired wood specie without the use of cooking liquors comprising the steps of:

providing a steam-jacketed digester vessel;

admitting chips of wood to said vessel;

impregnating said chips in said vessel with an aqueous ammonia solution and sulfur dioxide gas under a pressure of at least 150 p.s.i.g. while maintaining said chips under a vapor dome so that the liquid and gaseous reactants may circulate freely above, below, and on all sides of said chips at a temperature of at least 250° F. for an amount of time of up to about two hours effective to initiate a lignin depolymerizing reaction and form liquid and gaseous by-products;

separating said liquid and gaseous reactant by-products from said chips;

digesting said impregnated chips in sulfur dioxide gas, initially under a pressure of at least about 50 p.s.i.g., under a vapor dome so that the liquid and gaseous reactants may circulate freely above, below, and on all sides of said chips and maintaining said chips at a temperature of at least about 230° F. for an amount of time of up to about one hour effective to destroy at least a major portion of the lignin-cellulose bonds in said chips;

separating the gaseous contents of said vessel from said digested chips;

admixing said digested chips with a lignin solvent; and extracting lignin from said digested chips by agitating said chips and solvent in a defibrator to form a pulp slurry;

separating the lignin containing solution from said pulp.

2. The process of claim 1 further comprising:

recovering the lignin solvent from said lignin-containing solution for reuse in said process.

3. The process of claim 2 wherein said solvent is recovered by distillation.

4. The process of claim 2 comprising removing a major portion of the water in said lignin-containing solution by evaporation to form a lignin concentrate; and collecting said water.

5. The process of claim 4 further comprising washing said pulp a first time by slurrying said pulp in water and subsequently separating said wash water from said pulp; purifying said water by evaporation; and condensing the purified water, collecting said condensate for reuse.

6. The process of claim 5 further comprising washing said pulp a second time by slurrying said pulp in water and subsequently separating said wash water from said pulp; collecting said wash water for reuse.

7. The process of claim 5 wherein said wash water is admixed with the lignin containing solution from the defibrator for purification.

8. The process of claim 1 wherein said chips are impregnated from 10 to about 60 minutes in said vessel.

9. The process of claim 8 wherein said impregnated chips are digested from 10 to about 60 minutes in said vessel.

10. The process of claim 1 wherein said solvent is monoethanolamine.

11. The process of claim 1 wherein said chips are impregnated in a first digester vessel, and after separating the liquid and gaseous reactant by-products therefrom said process further comprises:

providing a second digester vessel;

conveying said chips to said second digester vessel for digesting said impregnated chips in sulfur dioxide gas.

12. A process for producing a lignin hardboard from wood chips comprising the steps of:
- providing a digester vessel;
- admitting chips of wood to said vessel;
- impregnating said chips in said vessel with an aqueous ammonia solution and sulfur dioxide gas under a pressure of at least 150 p.s.i.g. while maintaining said chips under a vapor dome so that the liquid and gaseous reactants may circulate freely above, below, an on all sides of said chips at a temperature of at least about 250° F., for an amount of time of up to about two hours effective to initiate a lignin depolymerizing reaction and form liquid and gaseous by-products;
- separating said liquid and gaseous reactant by-products from said chips;
- digesting said impregnated chips in sulfur dioxide gas, initially under a pressure of at least about 50 p.s.i.g., under a vapor dome so that the liquid and gaseous reactants may circulate freely above, below, and on all sides of said chips and maintaining said chips at a temperature of at least 230° F. for an amount of time of up to about one hour effective to destroy at least a major portion of the lignin-cellulose bonds in said chips;
- separating the gaseous contents of said vessel from said digested chips;
- grinding said digested chips; and
- heating said ground chips under pressure to form said board.

13. The process of claim 12 wherein said board is formed in a steam press.

14. The process of claim 13 further comprising applying about 900 pounds pressure to said ground chips in said press with about 30 pounds of steam pressure.

15. The process of claim 12 wherein said chips are impregnated in a first digester vessel, and after separating the liquid and gaseous reactant by-products therefrom said process further comprises:
- providing a second digester vessel;
- conveying said chips to said second digester vessel for digesting said impregnated chips in sulfur dioxide gas.

16. A process for producing a lignin resin comprising the steps of:
- providing a digester vessel;
- admitting chips of wood to said vessel;
- impregnating said chips in said vessel with an aqueous ammonia solution and sulfur dioxide gas under pressure of at least 150 p.s.i.g. while maintaining said chips under a vapor dome so that the liquid and gaseous reactants may circulate freely above, below, and on all sides of said chips at a temperature of at least about 250° F. for an amount of time of up to about two hours effective to initiate a lignin depolymerizing reaction and form liquid and gaseous by-products;
- separating said liquid and gaseous reactant by-products from said chips;
- digesting said impregnated chips in sulfur dioxide gas, initially under a pressure of at least about 50 p.s.i.g. under a vapor dome so that the liquid and gaseous reactants may circulate freely above, below, and on all sides of said chips and maintaining said chips at a temperature of at least about 230° F. for an amount of time of up to about one hour effective to destroy at least a major portion of the lignin-cellulose bonds in said chips;
- separating the gaseous contents of said vessel from said digested chips;
- admixing said digested chips with a lignin solvent; and extracting lignin from said digested chips by agitating said chips and solvent in a defibrator to form a pulp slurry;
- separating the lignin containing solution from said pulp.

17. The process of claim 16 further comprising:
- recovering the lignin solvent from said lignin containing solution for reuse in said process;
- removing a major portion of the water in said lignin containing solution by evaporation to form a lignin concentrate;
- admixing formaldehyde with said lignin concentrate to form a lignin-formaldehyde resin.

18. The process of claim 17 wherein said concentrate is admixed in about equal parts with a 30 percent aqueous formaldehyde solution.

19. A process for producing a lignin-resin glue comprising the steps of:
- providing a digester vessel;
- admitting chips of wood to said vessel;
- impregnating said chips in said vessel with an aqueous ammonia solution and sulfur dioxide gas under pressure of at least 150 p.s.i.g. while maintaining said chips under a vapor dome so that the liquid and gaseous reactants may circulate freely above, below, and on all sides of said chips at a temperature of at least about 250° F. for an amount of time of up to about two hours effective to initiate a lignin depolymerizing reaction and form liquid and gaseous by-products;
- separating said liquid and gaseous reactant by-products from said chips;
- digesting said impregnated chips in sulfur dioxide gas, initially under a pressure of at least about 50 p.s.i.g. under a vapor dome so that the liquid and gaseous reactants may circulate freely above, below, and on all sides of said chips and maintaining said chips at a temperature of at least about 230° F. for an amount of time of up to about one hour effective to destroy at least a major portion of the lignin-cellulose bonds in said chips;
- separating the gaseous contents of said vessel from said digested chips;
- admixing said digested chips with a lignin solvent; and
- extracting lignin from said digested chips by agitating said chips and solvent in a defibrator to form a pulp slurry;
- separating the lignin containing solution from said pulp;
- recovering the lignin solvent from said lignin containing solution for reuse in said process;
- removing a major portion of the water in said lignin containing solution by evaporation to form a lignin concentrate;
- admixing formaldehyde and phenol with said lignin-resin concentrate to form a lignin-resin glue.

20. The process of claim 19 wherein said glue comprises about 10 parts lignin concentrate, about 10 parts of a 30 percent aqueous formaldehyde solution, and about 1 part phenol.

21. A process for preparing a lignin-resin board comprising the steps of:
- providing a digester vessel;
- admitting chips of wood to said vessel;

impregnating said chips in said vessel with an aqueous ammonia solution and sulfur dioxide gas under a pressure of at least 150 p.s.i.g. while maintaining said chips under a vapor dome so that the liquid and gaseous reactants may circulate freely above, below, and on all sides of said chips at a temperature of at least about 250° F., for an amount of time of up to about two hours effective to initiate a lignin depolymerizing reaction and form liquid and gaseous by-products;

separating said liquid and gaseous reactant by-products from said chips;

digesting said impregnated chips in sulfur dioxide gas, initially under a pressure of at least about 50 p.s.i.g. under a vapor dome so that the liquid and gaseous reactants may circulate freely above, below and on all sides of said chips and maintaining said chips at a temperature of at least about 230° F. for an amount of time of up to about one hour effective to destroy at least a major portion of the lignin-cellulose bonds in said chips;

separating the gaseous contents of said vessel from said digested chips;

admixing said digested chips with a lignin solvent; and extracting lignin from said digested chips by agitating said chips and solvent in a defibrator to form a pulp slurry;

separating the lignin containing solution from said pulp;

recovering the lignin solvent from said lignin containing solution for reuse in said process;

removing a major portion of the water in said lignin containing solution by evaporation to form a lignin concentrate;

admixing formaldehyde with said lignin concentrate to form a lignin-formaldehyde resin;

admixing said resin and said pulp;

heating said mixture under pressure to form a lignin-resin board.

22. The process of claim 21 wherein said board is formed in a steam press.

23. The process of claim 22 further comprising applying about 900 pounds pressure to said pulp mixture in said press with about 30 pounds of steam pressure.

24. The process of claim 21 wherein said chips are impregnated for from 10 to 30 minutes and digested for from 10 to 30 minutes in said vessel.

25. A process for producing container grade pulp comprising the steps of:

providing a digester vessel;

admitting chips of wood to said vessel;

impregnating said chips in said vessel with an aqueous ammonia solution and sulfur dioxide gas under pressure of at least 150 p.s.i.g. while maintaining said chips under a vapor dome so that the liquid and gaseous reactants may circulate freely above, below and on all sides of said chips at a temperature of at least 250° F. for from 10 to 30 minutes;

separating said liquid and gaseous contents of said vessel from said chips;

digesting said impregnated chips in sulfur dioxide gas initially under a pressure of at least about 50 p.s.i.g. under a vapor dome so that the liquid and gaseous reactants may circulate freely above, below, and on all sides of said chips and maintaining said chips at a temperature of at least 230° F. for from 10 to 30 minutes;

separating the gaseous contents of said vessel from said digested chips;

admixing said digested chips with monoethanolamine; and extracting lignin from said digested chips by agitating said chips and monoethanolamine in a defibrator to form a pulp slurry;

separating the lignin containing liquid from said pulp.

26. The process of claim 25 wherein said chips are impregnated in a first digester vessel, and after separating the liquid and gaseous reactant by-products therefrom said process further comprises:

providing a second digester vessel;

conveying said chips to said second digester vessel for digesting said impregnated chips in sulfur dioxide gas.

27. A process for producing dissolving grade or high grade paper pulp comprising the steps of:

providing a digester vessel;

admitting chips of wood to said vessel;

impregnating said chips in said vessel with an aqueous solution and sulfur dioxide gas under a pressure of at least about 150 p.s.i.g. while maintaining said chips under a vapor dome so that the liquid and gaseous reactants may circulate freely above, below, and on all sides of said chips at a temperature of at least about 250° F. for at least about 60 minutes;

separating said liquid and gaseous contents of said vessel from said chips;

digesting said impregnated chips in sulfur dioxide gas, initially under a pressure of at least about 50 p.s.i.g. under a vapor dome so that the liquid and gaseous reactants may circulate freely above, below, and on all sides of said chips and maintaining said chips at a temperature of at least about 230° F. for from about 30 to about 60 minutes;

separating the gaseous contents of said vessel from said digested chips;

admixing said digested chips with monoethanolamine; and extracting lignin from said digested chips by agitating said chips and monoethanolamine in a defibrator to form a pulp slurry;

separating the lignin containing liquid from said pulp;

washing said pulp a first time by slurrying said pulp in water and subsequently separating said wash water from said pulp;

washing said pulp a second time by slurrying said pulp in water and subsequently separating said wash water from said pulp.

28. The process of claim 27 wherein said chips are impregnated in a first digester vessel, and after separating the liquid and gaseous reactant by-products therefrom said process further comprises;

providing a second digester vessel;

conveying said chips to said second digester vessel for digesting said impregnated chips in sulfur dioxide gas.

29. A process for producing a liquid fertilizer comprising the steps of:

providing a digester vessel;

admixing chips of wood to said vessel;

impregnating said chips in said vessel with an aqueous ammonia solution and sulfur dioxide gas under a pressure of at least 150 p.s.i.g. while maintaining said chips under a vapor dome so that the liquid and gaseous reactants may circulate freely above, below, and on all sides of said chips at a temperature of at least about 250° F. for an amount of time of up to about two hours effective to initiate a lignin depolymerizing reaction and form liquid and gaseous by-products;

separating said liquid and gaseous reactant by-products from said chips;

digesting said impregnated chips in sulfur dioxide gas, initially under a pressure of at least about 50 p.s.i.g. under a vapor dome so that the liquid and gaseous reactants may circulate freely above, below, and on all sides of said chips and maintaining said chips at a temperature of at least about 230° F. for an amount of time of up to about one hour effective to destroy at least a major portion of the lignin-cellulose bonds in said chips and form gaseous by-products;

separating the gaseous reactant by-products from said digester chips;

combining the liquid and gaseous reactant by-products of impregnation and digestion;

reacting said by-products with a sulfite oxidizing agent to form sulfate compounds;

neutralizing said reactants;

recovering at least a major portion of the water from said reactants to form a liquid fertilizer concentrate.

30. The process of claim 29 wherein said oxidizing agent is nitric acid.

31. The process of claim 29 wherein said oxidizing agent is ferric ion.

32. The process of claim 29 further comprising:
reacting said by-products with a metallic chelating agent to form chelates with the organic constituents thereof.

33. The process of claim 32 further comprising reacting said by-products with said metallic chelating agent in an electrolytic cell wherein said agent enters solution for reaction with said by-products at the anode of said cell by ionization of said anode.

34. A pollution-free process for producing wood pulp in any desired grade from any desired wood specie without the use of cooking liquors comprising the steps of:
providing a vessel;
admitting chips of wood to said vessel;
impregnating said chips in said vessel with an aqueous ammonia solution and sulfur dioxide gas under a pressure of at least 150 p.s.i.g. while maintaining said chips under a vapor dome so that the liquid and gaseous reactants may circulate freely above, below, and on all sides of said chips at a temperature of at least 250° F. for an amount of time of up to about two hours effective to initiate a lignin depolymerizing reaction and form liquid and gaseous by-products;
separating said liquid and gaseous reactant by-products from said chips;
digesting said impregnated chips in said vessel by admitting sulfur dioxide gas thereinto until the internal pressure is at least about 50 p.s.i.g., said chips being under a vapor dome so that the liquid and gaseous reactants may circulate freely above, below, and on all sides of said chips and maintaining said chips at a temperature of at least about 230° F. for an amount of time of up to about one hour effective to destroy at least a major portion of the lignin-cellulose bonds in said chips and cause the pressure within said vessel to substantially decrease;
separating the gaseous contents of said vessel from said digested chips;
admixing said digested chips with a lignin solvent; and extracting lignin from said digested chips by agitating said chips and solvent in a defibrator to form a pulp slurry;
separating the lignin-containing solution from said pulp.

35. The process of claim 34 further comprising:
recovering the lignin solvent from said lignin containing solution for reuse in said process.

36. The process of claim 35 wherein said solvent is recovered by distillation.

37. The process of claim 35 comprising removing a major portion of the water in said lignin containing solution by evaporation to form a lignin concentrate; and
collecting said water.

38. The process of claim 34 further comprising washing said pulp a first time by slurrying said pulp in water and subsequently separating said wash water from said pulp; purifying said water by evaporation; and condensing the purified water, collecting said condensate for reuse;

39. The process of claim 38 further comprising washing said pulp a second time by slurrying said pulp in water and subsequently separating said wash water from said pulp collecting said wash water for reuse.

40. The process of claim 38 wherein said wash water is admixed with the lignin containing solution from the defibrator for purification.

41. The process of claim 34 wherein said chips are impregnated from 10 to 90 minutes in said vessel.

42. The process of claim 34 wherein said impregnated chips are digested from 10 to about 60 minutes in said vessel.

43. The process of claim 34 wherein said solvent is monoethanolamine.

44. The process of claim 34 wherein said chips are impregnated in a first vessel, and after separating the liquid and gaseous reactant by-products therefrom said process further comprises:
providing a second digester vessel;
conveying said chips to said second vessel for digesting said impregnated chips in sulfur dioxide gas.

45. The process of claim 34 wherein the step of separating the gaseous contents of the vessel from said chips comprises:
providing first and second storage vessels;
venting the gaseous contents of said vessel incrementally into said first vessel; conveying each increment of said gaseous contents from said first to said second vessel for storage before venting a subsequent increment thereof into said first vessel whereby said gases will be available for reuse.

46. The process of claim 45 further comprising:
cooling each increment of said gaseous reactants in said first vessel before conveying said gas to said second vessel; and separately conveying any condensate in said first vessel to said second vessel.

47. The process of claim 46 further comprising:
cooling each increment of the gaseous reactant and condensate conveyed to said second vessel.

48. The process of claim 46 whrein said first vessel is a heat exchanger adapted to maintain a cooling medium in a heat transfer relationship with the contents of said vessel said process further comprising:

maintaining lignin solvent in a heat transfer relationship with the gaseous contents of said vessel when said contents are incrementally in said first storage vessel so that the gaseous contents of said vessel are cooled as they are conveyed from said vessel to said second storage vessel through said first storage vessel and the lignin solvent is heated.

49. The process of claim 48 wherein the step of admixing said digested chips with a lignin solvent comprises adding lignin solvent heated in said first storage vessel to said chips in said vessel, and maintaining said chips and solvent under a pressure of at least about 50 p.s.i.g. and at temperature of up to about 250° F. for up to about 30 to 60 minutes before extracting lignin from said digested chips.

50. The process of claim 34 wherein the step of admixing said digested chips with a lignin solvent comprises:

adding said solvent to said digested chips in said vessel and maintaining said chips and solvent under a pressure of at least about 50 p.s.i.g. and a temperature of up to about 250° F. for up to about 30 to 60 minutes before extracting lignin from said digested chips.

51. A pollution-free process for producing loose cedar wood fibers:

providing a vessel;

admitting cedar wood chips to said vessel;

impregnating said chips in said vessel with an aqueous ammonia solution and sulfur dioxide gas under a pressure of at least 150 p.s.i.g. while maintaining said chips under a vapor dome so that the liquid and gaseous reactants may circulate freely above, below, and on all sides of said chips at a temperature of at least 250° F. for an amount of time of up to about two hours effective to initiate a lignin depolymerizing reaction and form liquid and gaseous by-products;

separating said liquid and gaseous reactant by-products from said chips;

providing a high speed defibrator;

admitting said impregnated chips to said defibrator and defibrating said chips therein to produce a loose cedar wood fibrous material.

* * * * *